United States Patent
Whitney et al.

(10) Patent No.: US 11,266,057 B2
(45) Date of Patent: Mar. 8, 2022

(54) HYDRAULIC IMPLEMENT FLUID RECOVERY

(71) Applicant: Deere & Company, Moline, IL (US)

(72) Inventors: Michael M. Whitney, Bettendorf, IA (US); Randall A. Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/070,523

(22) Filed: Oct. 14, 2020

(65) Prior Publication Data

US 2021/0022281 A1 Jan. 28, 2021

Related U.S. Application Data

(63) Continuation of application No. 15/978,896, filed on May 14, 2018, now Pat. No. 10,918,004.

(51) Int. Cl.
*A01B 63/10* (2006.01)
*E02F 9/22* (2006.01)
(Continued)

(52) U.S. Cl.
CPC ............ *A01B 63/10* (2013.01); *E02F 9/2239* (2013.01); *E02F 9/2296* (2013.01); *F15B 1/26* (2013.01);
(Continued)

(58) Field of Classification Search
CPC ... A01B 59/041; A01B 59/0415; A01B 63/10; A01B 63/32; F15B 1/025; F15B 9/08; F15B 1/26
See application file for complete search history.

(56) References Cited

U.S. PATENT DOCUMENTS

| 4,074,703 A | 2/1978 | Smith |
| 4,091,846 A | 5/1978 | Legleiter |

(Continued)

FOREIGN PATENT DOCUMENTS

| DE | 4408251 A1 | 10/1994 | |
| EP | 2025215 A1 * | 2/2009 | ............. A01B 63/32 |
| EP | 2025215 A1 | 2/2009 | |

OTHER PUBLICATIONS

European Search Report issued in counterpart application No. 19168523.9 dated Sep. 27, 2019. (11 pages).
(Continued)

*Primary Examiner* — Abiy Teka
(74) *Attorney, Agent, or Firm* — Christopher J. Volkmann; Kelly, Holt & Christenson, PLLC (57) ABSTRACT

An implement includes a mechanical coupling component configured to removably couple the implement to a support machine, a hydraulic fluid supply line configured to receive a supply flow of hydraulic fluid under pressure from a hydraulic system associated with the support machine, and a hydraulically-powered component configured to be actuated using the hydraulic fluid. The implement also includes a hydraulic fluid recovery system comprising a hydraulic fluid return line configured to fluidically couple to the hydraulic system associated with the support machine and provide a return flow of hydraulic fluid to the hydraulic system. A hydraulic fluid reservoir is configured to, when the hydraulic fluid return line is decoupled from the hydraulic system associated with the support machine, receive a portion of the hydraulic fluid from the hydraulic fluid return line when a fluid pressure in the hydraulic fluid return line increases to a pressure threshold.

19 Claims, 8 Drawing Sheets

(51) Int. Cl.
  *F15B 1/26* (2006.01)
  *F15B 9/08* (2006.01)
(52) U.S. Cl.
  CPC ........... *F15B 9/08* (2013.01); *F15B 2211/255* (2013.01); *F15B 2211/353* (2013.01); *F15B 2211/6051* (2013.01); *F15B 2211/6355* (2013.01); *F15B 2215/30* (2013.01)

(56) References Cited

U.S. PATENT DOCUMENTS

| | | | |
|---|---|---|---|
| 4,244,403 | A | 1/1981 | Legleiter |
| 7,240,812 | B2 | 7/2007 | Kamikozuru |
| 10,918,004 | B2 * | 2/2021 | Whitney ................ A01B 63/10 |
| 2016/0316611 | A1 | 11/2016 | Fink et al. |
| 2019/0343033 | A1 | 11/2019 | Whitney et al. |

OTHER PUBLICATIONS

Prosecution History for U.S. Appl. No. 15/978,896 including: Notice of Allowance dated Oct. 13, 2020, Amendment dated Aug. 21, 2020, Non-Final Office Action dated May 21, 2020, Preliminary Amendment dated May 16, 2018, and Application and Drawings filed May 14, 2018, 83 pages.

\* cited by examiner

HYDRAULIC IMPLEMENT FLUID RECOVERY

CROSS-REFERENCE TO RELATED APPLICATION

The present application is a continuation of U.S. patent application Ser. No. 15/978,896 filed May 14, 2018, the content of which is hereby incorporated by reference in its entirety.

FIELD OF THE DESCRIPTION

The present description generally relates to hydraulic implements, or other hydraulic work machines, that are driven or powered by a hydraulic system associated with a support machine. More specifically, but not by limitation, the present description relates to a fluid recovery system for a hydraulic implement.

BACKGROUND

There are many different types of implements that are hydraulically-powered by a support vehicle or other support machine. Further, implements are utilized in a variety of different types of applications. For example, in an agricultural application, an agricultural implement can include tools for operations such as tillage, planting, spraying, baling, to name a few. In a turf management application, a turf management implement can comprise a mower, sod cutter, sprayer, planter, etc. Further, in construction and/or forestry applications, the implements can include hydraulic arms, loaders, buckets, grapples, among others.

Such implements are typically attachable/detachable from the support machine, such as a tractor or other mobile machine. In this way, the support machine can be equipped for any of a variety of different types of implements, depending on the particular application needs. The support machine and implement include corresponding hydraulic couplers that allow the implement to be quickly and easily connected/disconnected from a hydraulic system associated with the mobile machine that provides a supply of hydraulic fluid under pressure, that is utilized by the implement for actuating (driving, deploying, etc.) its components.

Further, an implement can be carried by the support machine in a variety of ways. For instance, the support machine can be configured to tow the implement. In another example, the implement can be mounted on the support machine, such as mounted on a front of an agricultural tractor.

The discussion above is merely provided for general background information and is not intended to be used as an aid in determining the scope of the claimed subject matter.

SUMMARY

An example implement comprises a mechanical coupling component configured to removably couple the implement to a support machine, a hydraulic fluid supply line configured to receive a supply flow of hydraulic fluid under pressure from a hydraulic system associated with the support machine, and a hydraulically-powered component configured to be actuated using the hydraulic fluid. The implement also includes a hydraulic fluid recovery system comprising a hydraulic fluid return line configured to fluidically couple to the hydraulic system associated with the support machine and provide a return flow of hydraulic fluid to the hydraulic system. A hydraulic fluid reservoir is configured to, when the hydraulic fluid return line is decoupled from the hydraulic system associated with the support machine, receive a portion of the hydraulic fluid from the hydraulic fluid return line when a fluid pressure in the hydraulic fluid return line increases to a pressure threshold.

An example hydraulic system for an implement comprises a supply line connection configured to removably couple a hydraulic fluid supply line to a source hydraulic system associated with a support machine, a return line connection configured to removably couple a hydraulic fluid return line to the source hydraulic system, and a hydraulic fluid recovery component configured to convey hydraulic fluid from the hydraulic fluid return line to a hydraulic fluid reservoir while the hydraulic fluid return line is decoupled from the source hydraulic system, and when fluid pressure in the hydraulic fluid return line reaches a pressure threshold.

An example agricultural implement comprises a coupling assembly configured to removably couple the agricultural implement to a support machine, and a hydraulic system. The hydraulic system comprises a supply line connection configured to removably couple a hydraulic fluid supply line to a source hydraulic system associated with the support machine, a return line connection configured to removably couple a hydraulic fluid return line to the source hydraulic system, a flow control mechanism configured to prevent fluid flow through the return line connection at fluid pressures below a pressure threshold, and a hydraulic fluid recovery component configured to convey hydraulic fluid from the hydraulic fluid return line to a hydraulic fluid reservoir when the hydraulic fluid return line is decoupled from the source hydraulic system, and fluid pressure in the hydraulic fluid return line is less than the pressure threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As briefly mentioned above, there are a wide variety of different types of hydraulically powered implements (or other work machines) that are removably couplable to a support machine and configured to receive a supply of hydraulic fluid (e.g., hydraulic oil) under pressure from a hydraulic system on the support machine.

Typically, the support machine has a supply line from a hydraulic fluid pump and a supply line coupler configured to receive a corresponding supply line coupler on the implement. These couplers can be any of a wide variety of different coupler types, such as, but not limited to, flush-face couplers, spin-on couplers, lock-ring couplers, or other types of quick connect/disconnect couplers. The couplers on the support machine and the implement comprise corresponding valves (or other flow control mechanisms) that are mechanically opened when the couplers are coupled to one another to allow fluid flow to the implement, and closed when they decoupled to prevent fluid flow.

Similarly, the support machine and implement include one or more corresponding return lines, that are configured to return hydraulic fluid to the support machine. These return line(s) also have corresponding couplers, with associated flow control mechanisms, such as the examples mentioned above. In some instances, a number of return lines can be utilized. For instance, a first return line returns hydraulic fluid to a supply tank or reservoir on the support machine, from which the support machine pumps the hydraulic fluid through the supply line. Additionally, separate return lines can provide a return flow of hydraulic fluid through sensing circuitry and/or directly to the fluid pump to be pumped back to the implement. These, of course, are by way of example only.

When not in use, the implement is decoupled from the support machine by detaching any mechanical connections, such as a hitch or other linkage, and disconnecting the hydraulic fluid and/or electrical connections. The implement is then stored until later use. In many cases, implements are stored outdoors or in other environments that can cause the fluid pressure in the implement's hydraulic circuitry to increase due to thermal expansion, or other causes. This increase in the internal fluid pressure can cause a number of problems. For instance, the increased pressure can cause spontaneous actuation of components on the implement (e.g., deployment of hydraulic arms, etc.). Alternatively, or in addition, the increased pressure can cause valves, seals, hoses, or other hydraulic circuitry components to fail and/or other structural components on the implement to bend or deform. This, of course, can cause damage to the implement and/or the surrounding environment, and is undesirable.

One way to mitigate some of the above problems is to provide pressure release coupler(s) on the hydraulic lines of the implement. The pressure release coupler(s) are configured to release some of the fluid pressure when the internal pressure of the hydraulic circuitry reaches a threshold. However, this results in the hydraulic fluid being expelled into the surrounding environment, such as onto the ground, which results in a waste of the hydraulic fluid and can raises environmental or other concerns.

Figure 1A:
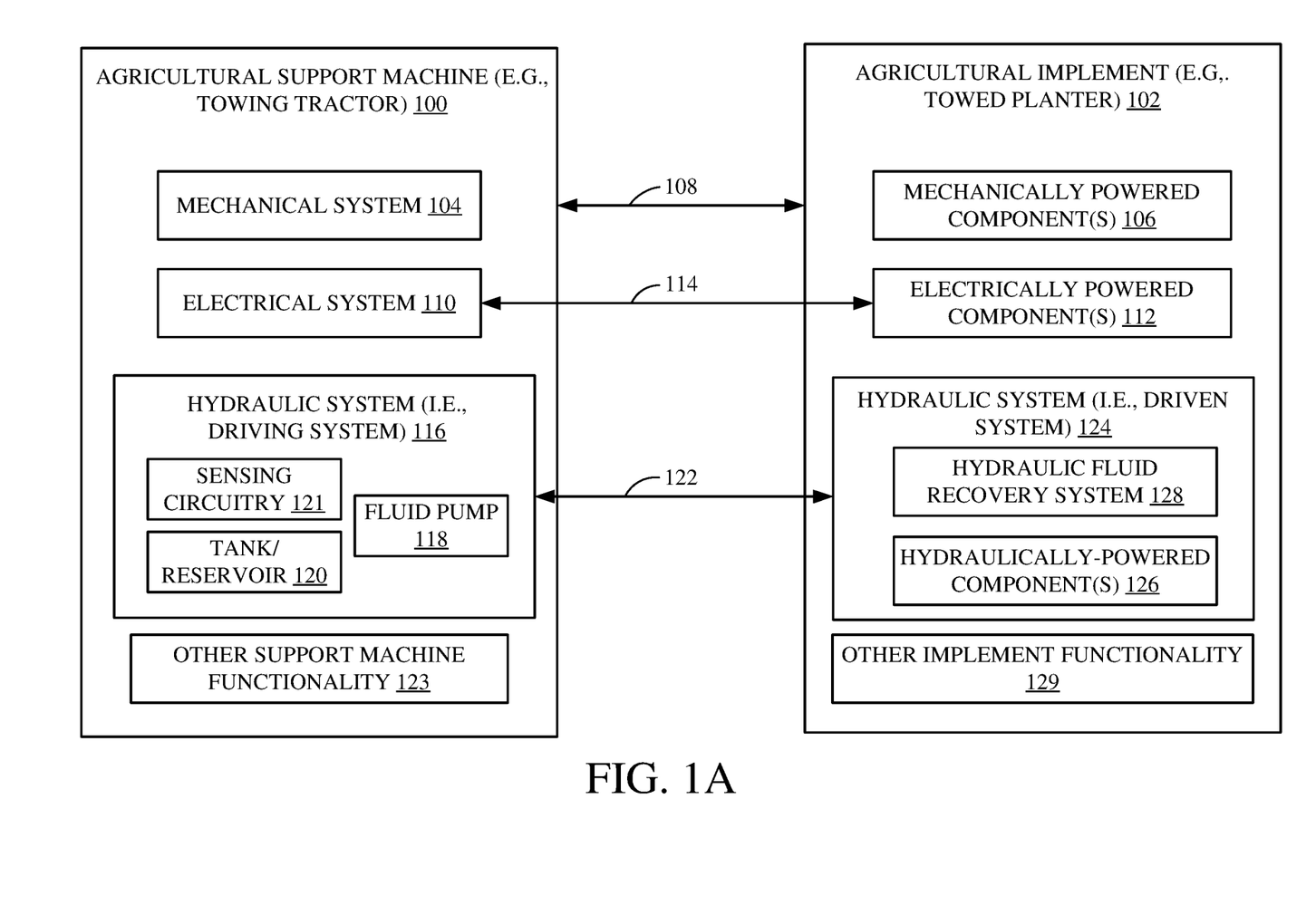
FIG. 1A is a block diagram of one example of a support machine configured to hydraulically drive an implement.

FIG. 1A is a block diagram of one example of a support machine (e.g., a towing agricultural tractor or other vehicle) 100 configured to tow an implement 102 (e.g., a planter or other type of agricultural implement) having a hydraulic fluid recovery system configured to recover hydraulic fluid based on increases in internal hydraulic circuitry pressure, when the implement is disconnected from the support machine.

It is noted that while examples are described herein in the context of an agricultural vehicle towing an agricultural implement, the example systems and related components and methods can be utilized in other types of machines and applications as well, such as, but not limited to, turf management, forestry, construction, to name a few. Further, agricultural support machine 100 is described in the context of towing agricultural implement 102. It is noted that, in other examples, the agricultural implement 102 can be attached to the support machine 100 in other ways as well (e.g., attached and carried on a front end of support machine 100).

As shown in FIG. 1A, agricultural support machine 100 includes a mechanical system 104 configured to generate mechanical power that is used to operate support machine 100 and/or can be transferred to agricultural implement 102 to power components 106. For example, system 104 can comprise a power take off (PTO) comprising a splined drive shaft configured to be mated with fittings on implement 102 to power components 106. Further, the mechanical system 104 provides power to propel agricultural support machine 100 across a terrain, to facilitate towing (or otherwise carrying) agricultural implement 102 via a mechanical linkage 108 (e.g., a three-point hitch, etc.).

Agricultural support machine 100 also includes an electrical system 110, a hydraulic system 116, and can include other functionality 123 as well.

Electrical system 110 is coupled to components 112 of agricultural implement 102 via electrical circuitry connections 114. Hydraulic system 116 (referred to as the driving system) includes a fluid pump 118 configured to pump hydraulic fluid from a tank or reservoir 120. Hydraulic system 116 can be powered by an engine or other part of agricultural support machine 100. Hydraulic system 116 can also include sensing circuitry 121 configured to sense characteristics of the hydraulic system, such as, but not limited to, fluid pressure and/or fluid flow rate. Hydraulic system 116 is illustratively connected to agricultural implement 102 to provide hydraulic fluid under pressure over a hydraulic link 122.

Figure 1B:
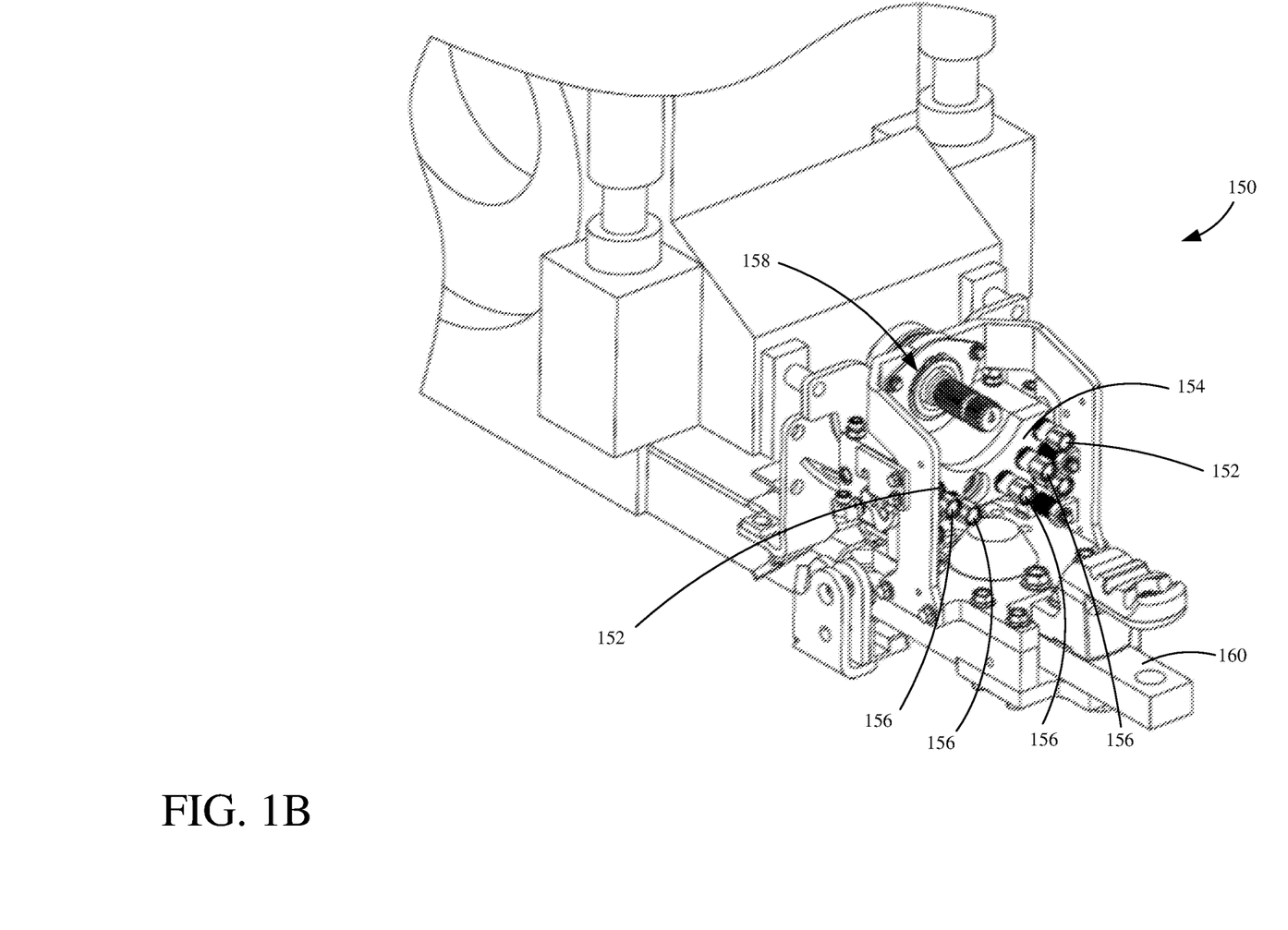
FIG. 1B illustrates one example of a coupling assembly configured to couple a towed implement to a support machine.

FIG. 1B illustrates one example of a coupling assembly 150 configured to couple a towed implement (such as implement 102) to a support machine (such as machine 100). As shown in FIG. 1B, coupling assembly 150 includes one or more electrical couplers 152 mounted on a coupler plate 154. Electrical couplers 152 are configured to couple to corresponding electrical couplers on the implement, for example to form electrical link 114 shown in FIG. 1A.

Coupler plate 154 also includes a set of hydraulic couplers 156 configured to couple to corresponding hydraulic couplers on the implement. Illustratively, couplers 156 are configured to form the hydraulic link 122 shown in FIG. 1A (i.e., supply and return lines for the hydraulic fluid).

In the example of FIG. 1B, coupling assembly 150 includes a mechanical connection 158 (e.g., for link 108 shown in FIG. 1A) in the form of a power take-off (PTO) coupler member that is releasably engageable to a corresponding PTO component on the implement. Coupling assembly 150 also includes a hitch 160 configured to connect to and tow the implement.

Referring again to FIG. 1A, agricultural implement 102 includes a hydraulic system 124 (referred to as the driven system) that includes one or more hydraulic-powered components 126 that are actuated or otherwise driven using the hydraulic fluid under pressure received via link 122. By way of example, but not by limitation, agricultural implement 102 can be any of a variety of types of agricultural implements. For example, agricultural implement 102 can be a seeder or planter, a mower, a tiller, a baler, or any other implement that receives hydraulic fluid under pressure for operation. In the case of a planter, components 126 can include row units that are hydraulically-actuated (e.g., raised and lowered).

Agricultural implement 102 includes hydraulic fluid recovery system 128, and can include other functionality 129 as well. Hydraulic fluid recovery system 128 is configured to recover hydraulic fluid in implement 192, by capturing and storing the hydraulic fluid when implement 102 is disconnected from hydraulic system 116. As discussed in further detail below, hydraulic fluid recovery system 128 is configured to automatically recover hydraulic fluid from the hydraulic circuitry in system 124 when the hydraulic fluid pressure increases due to thermal expansion, or other causes. By way of example, when agricultural implement 102 is disconnected and left outdoors, the effect of thermal expansion of the hydraulic fluid increases the internal pressure in the hydraulic circuitry. In this case, hydraulic fluid recovery system 128 is configured to temporarily collect a portion of the hydraulic fluid when the internal pressure meets or exceeds a threshold. This functions to keep the fluid pressure at or below the threshold, without having to vent the fluid into the surrounding environment. When agricultural implement 102 is subsequently reconnected, the collected hydraulic fluid is transferred back to hydraulic system 116.

Figure 2:
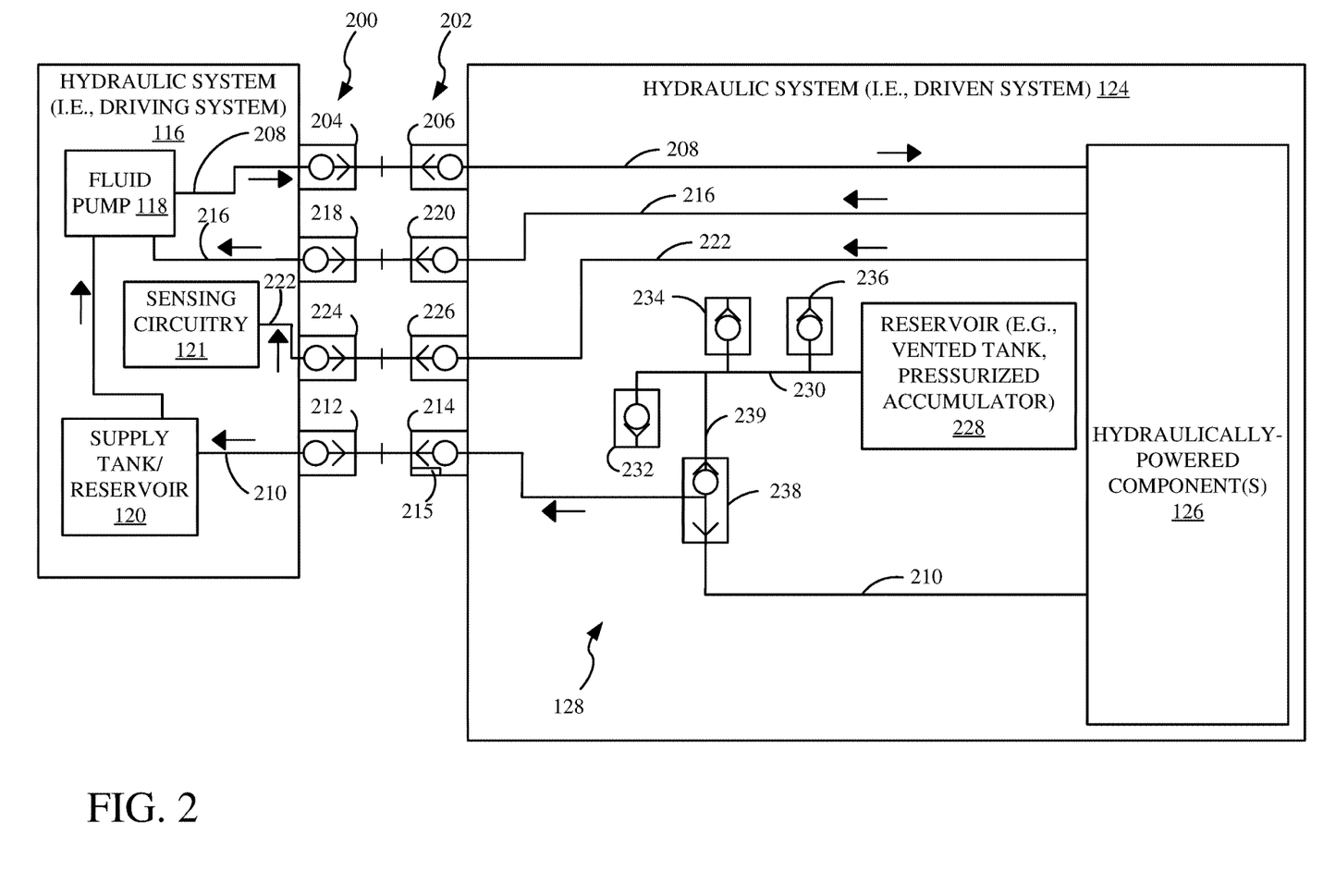
FIG. 2 is a block diagram illustrating one example of a hydraulically-driven implement coupled to a support machine.

FIG. 2 is a block diagram of one example of hydraulic systems 116 and 124, shown in FIG. 1A. As illustrated, hydraulic system 116 includes a set of connectors 200 (e.g., couplers 156 shown in FIG. 1B), and hydraulic system 124 includes a corresponding set of connectors 202, which are configured to releasably couple to the set of connectors 200. In the example of FIG. 2, set 200 includes connectors 204, 212, 218, and 224, and set 202 includes connectors 206, 214, 220, 226, which are discussed in further detail below.

Each connector in sets 200 and 202 includes a respective flow control mechanism configured to allow fluid flow through the respective connector when coupled, and prevent fluid flow when decoupled. In one example, the connectors 200 and 202 comprise respective sets of quick connect/disconnect couplers, each having a flow control mechanism that is mechanically opened through physical coupling of the connectors, and closed when the couplers are disconnected. Each fluid line is formed by one or more conduits (formed of any suitable material) that convey the hydraulic fluid through the hydraulic circuitry.

As illustrated, hydraulic system 116 includes supply line connector 204 configured to receive corresponding supply line connector 206 of hydraulic system 124. When connected, the fluid control mechanisms associated with connectors 204 and 206 are opened, thereby providing a hydraulic fluid under pressure though supply line 208 to one or more hydraulically-powered components 126.

Hydraulic systems 116 and 124 also include at least one hydraulic fluid return line or configured to provide a return flow of hydraulic fluid, used by component(s) 126, to hydraulic system 116. In the illustrated example, three return lines are utilized. Of course, more than or less than three return lines are within the scope of the present disclosure.

A first return line 210 provides a return flow of fluid from component(s) 126 to the supply tank 120. Return line 210 is formed by corresponding connectors 212 and 214 having associated flow control mechanisms, as mentioned above. In one example in which hydraulically-powered component(s) 126 comprises a hydraulically driven motor, return line 210 comprises a motor case drain.

A second return line 216 comprises corresponding connectors 218 and 220. Return line 216 provides a return flow of hydraulic fluid to the hydraulic pump 118. A third return line 222 comprises corresponding connectors 224 and 226, and provides a return flow to sensing circuitry 121. As such, return line 222 comprises a load sensing line that can be used by sensing circuitry 121 to sense a load or other operational characteristic of component(s) 126.

One or more of the connectors of system 124, that are associated with the return lines, can have a pressure relief valve (or other pressure relief feature) configured to open when fluid pressure reaches a pressure relief threshold or set point. In the example of FIG. 2, connector 214 includes a pressure relief valve (represented by block 215). Valve 215 is configured to open when the fluid pressure in line 210 reaches the pressure relief threshold. This pressure relief threshold is set low enough so as to prevent damage to the implement due to thermal expansion of the hydraulic fluid. As mentioned above, valve 215 is therefore configured to vent hydraulic fluid from return line 210 (i.e., while system 124 is decoupled from system 116) to keep the fluid pressure at or below the pressure relief threshold. In one example of an agricultural implement, such as a planter, the pressure relief threshold is approximately 25 pounds per square inch (PSI).

As illustrated in FIG. 2, hydraulic fluid recovery system 128 of hydraulic system 124 includes a reservoir 228 with a corresponding fluid recovery line 230 having connectors 232, 234, and 236. During operation (i.e., while hydraulic system 124 is coupled to hydraulic system 116), the return flow of hydraulic fluid through return line 210 actuates a flow control mechanism 238 from a first position (which prevents fluid flow through line 210) to a second position (shown in FIG. 2) that allows fluid flow through line 210. This actuation of mechanism 238 allows the return flow through connectors 214 and connector 212, and into supply reservoir 120. In the illustrated example, mechanism 238 comprises a shuttle valve.

Figure 3:
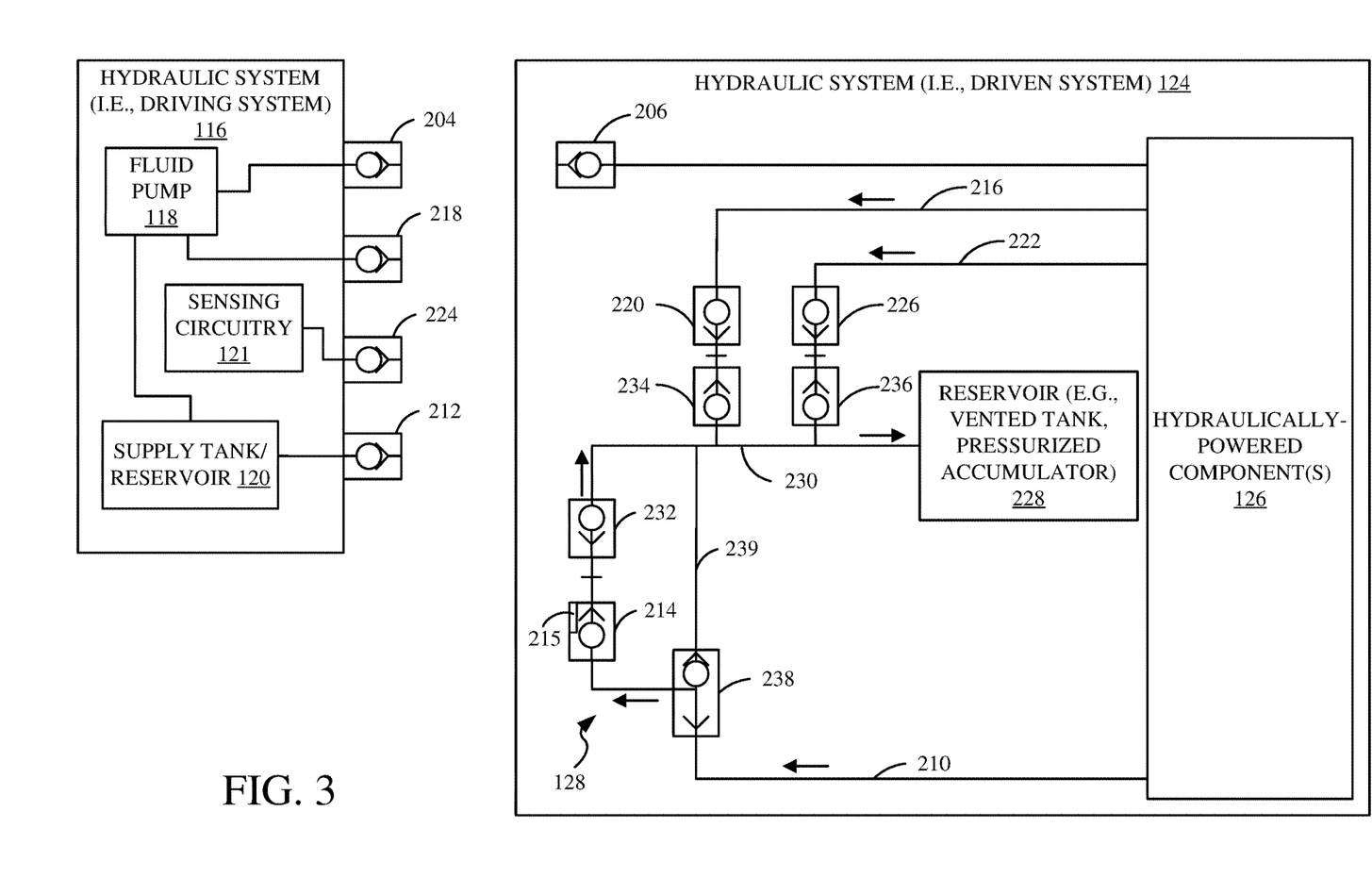
FIG. 3 is a block diagram of the hydraulically driven implement shown in FIG. 2, decoupled from the support machine.

FIG. 3 illustrates systems 116 and 124 in a disconnected state, in which the support machine 100 and agricultural implement 102 are hydraulically disconnected from each other. By way of example, to decouple implement 102 from support machine 100, an operator disconnects the set of connectors 202 from the set of connectors 200. Then, as shown in FIG. 3, the operator connects the return line connectors 214, 220, and 226 to connectors 232, 234, and 236, respectively, of fluid recovery line 230, which mechanically opens the corresponding flow control mechanisms associated with connectors 214, 220, 226, 232, 234, and 236. In this manner, the return lines 210, 216, 222 are fluidically coupled to the reservoir 228 of fluid recovery system 128.

Fluid recovery system 128 is configured such that hydraulic fluid flows into, and is stored by, reservoir 228 when the fluid pressure in any of lines 210, 216, and 222 reaches or exceeds a fluid recovery threshold. In one example, the fluid recovery threshold is set to be lower than the above-mentioned pressure relief threshold, above which point damage to the implement may occur due to high pressure. In one example, the fluid recovery threshold is a function of the configuration of reservoir 228, which applies a back pressure to the fluid in fluid recovery line 230. For instance, reservoir 228 can be elevated with respect to the return lines, such that the back pressure is a function of gravity on the fluid flow. One example of an elevated, vented fluid reservoir is discussed below with respect to FIG. 6.

Alternatively, or in addition, reservoir 228 can comprise a pressurized accumulator. Examples of discussed below with respect to FIGS. 7 and 8. Briefly, however, a pressurized accumulator can comprise a diaphragm, bladder, piston or other component that applies a biasing force against fluid received in an accumulation chamber.

The above-mentioned fluid recovery threshold can be set depending on the particular components of agricultural implement 102. For instance, the fluid recovery threshold can be set below a point where spontaneous implement component deployment occurs. Alternatively, or in addition, the fluid recovery threshold can be set below a point where structural damage (e.g., motor shaft seals, etc.) to, or fluid leakage from, implement 102 (e.g., through valve 215) would occur. In one example agricultural implement, the fluid recovery threshold is less than approximately 25 pounds per square inch (PSI), but greater than approximately 5 PSI.

When agricultural implement 102 is subsequently recoupled to support machine 100 (as shown in FIG. 2), fluid connection 214 is coupled to fluid connection 212 associated with supply reservoir 120. When this occurs, a discharge fluid path is formed from reservoir 228 to supply reservoir 120. More specifically, the discharge fluid path runs through line 230, discharge bypass line 239, valve 238 (in the closed position shown in FIG. 2), and connectors 214 and 212. This discharge fluid path allows the previously accumulated/recovered hydraulic fluid to be returned to supply reservoir 120.

Figure 4:
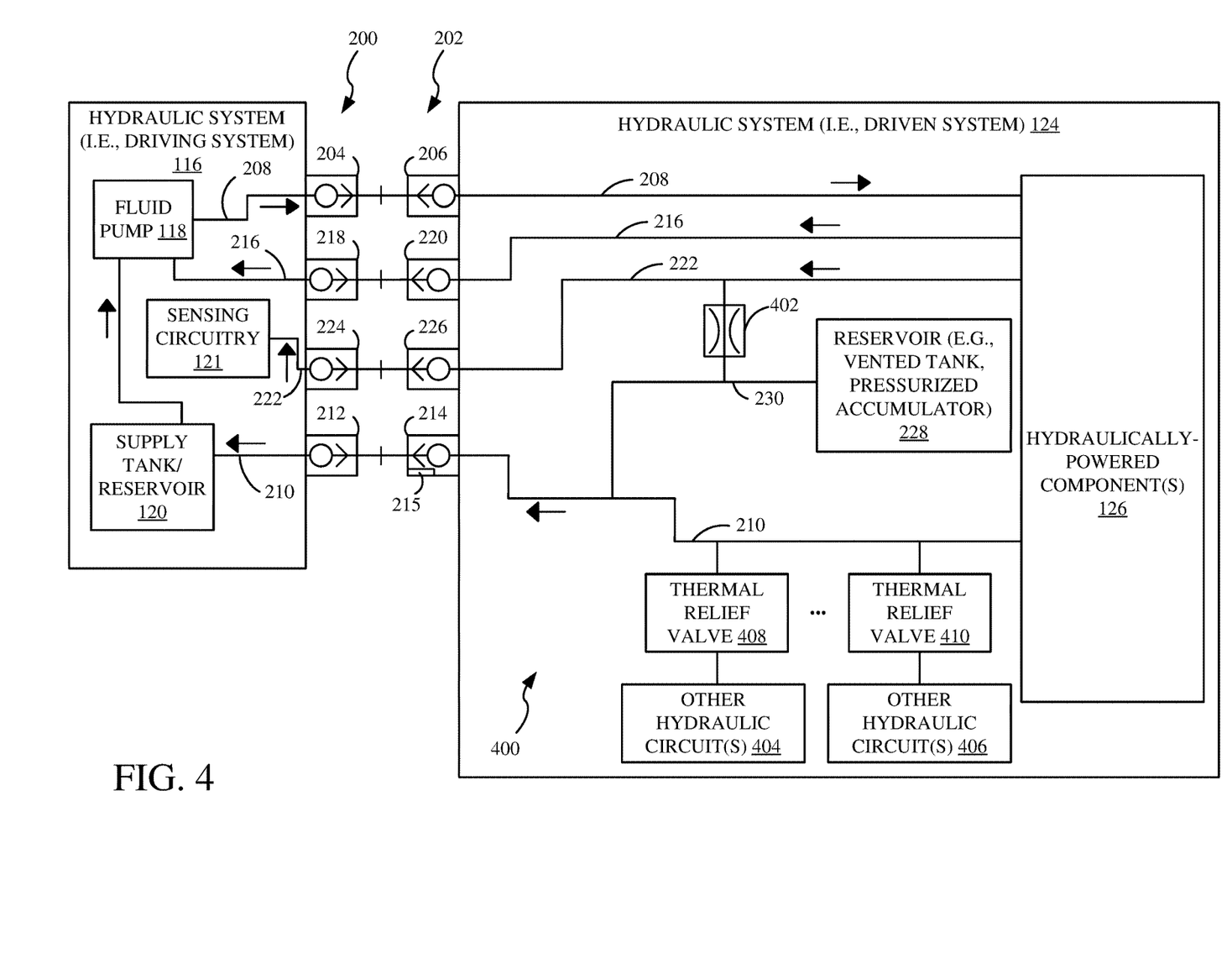
FIG. 4 is a block diagram illustrating one example of a hydraulically-driven implement coupled to a support machine.
Figure 5:
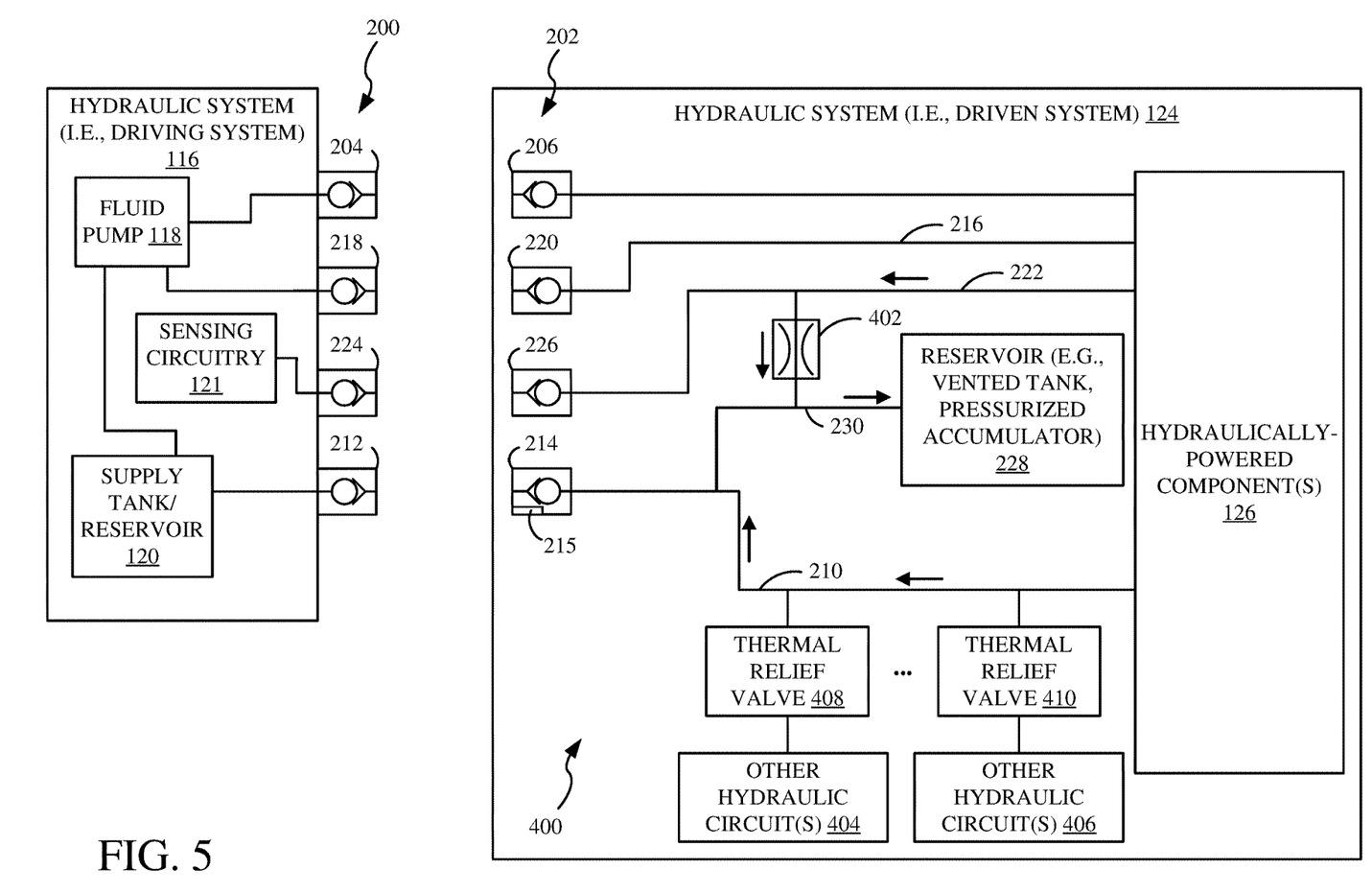
FIG. 5 is a block diagram of the hydraulically driven implement shown in FIG. 4, decoupled from the support machine.

FIGS. 4 and 5 illustrate another example of a hydraulic fluid recovery system 400 for hydraulic system 124. Hydraulic fluid recovery system 400 is similar, in some respects, to system 128 discussed above. However, as shown in FIG. 5 in which the set of connectors 202 is disconnected from the set of connectors 200, connectors 214, 220 and 226 do not require reconnection to fluid recovery line 230. Also, system 400 does not include check valves to connect the return lines to the fluid recovery line 230. The back pressure associated with reservoir 228 is below the pressure relief threshold of pressure relief valve 215 associated with connector 214. In one particular example, valve 215 is configured to open at 25 PSI. In this case, the fluid recovery threshold, which is a function of the back pressure applied by reservoir 228, is less than 25 PSI (e.g., 24 PSI or less). As such, the reservoir 228 will receive and store the hydraulic fluid when the pressure in return line 210 reaches the fluid recovery threshold, thus preventing the pressure from reaching a point at which valve 215 would open (i.e., 25 PSI in the above example). In another example, the fluid recovery threshold is set to approximately 20 PSI. In another example, the fluid recovery threshold is set to approximately 15 PSI.

The pressure threshold can also be set to a relatively low pressure (e.g., less than approximately 10 PSI), which can allow some fluid to flow to reservoir 228 during operation of implement 102, i.e., due to operational pressure spikes in the fluid circuitry. In one example, the back pressure is set to be approximately 6 PSI. To illustrate, in the case of planter, a hydraulically operated row unit may experience a pressure spike due to variations in operational characteristics. This pressure spike is dampened by the accumulation of hydraulic fluid in reservoir 228.

In the example shown in FIGS. 4 and 5, a flow control mechanism 402 couples return line 222 to fluid recovery line 230. Flow control mechanism 402 is configured to bleed off pressure from return line 222 to line 230, when the pressure reaches a threshold. In one example, mechanism 402 comprises a bleed down orifice, or other flow control mechanism.

As shown in FIGS. 4 and 5, other hydraulic circuits 404 and 406 (e.g., coupled to other hydraulically-powered components) are coupled to return line 210 through corresponding thermal relief valves 408 and 410. Thermal relief valves 408 and 410 operate to bleed down pressure when the pressure from hydraulic circuits 404 and 406 reach a thermal relief pressure threshold.

Figure 6:
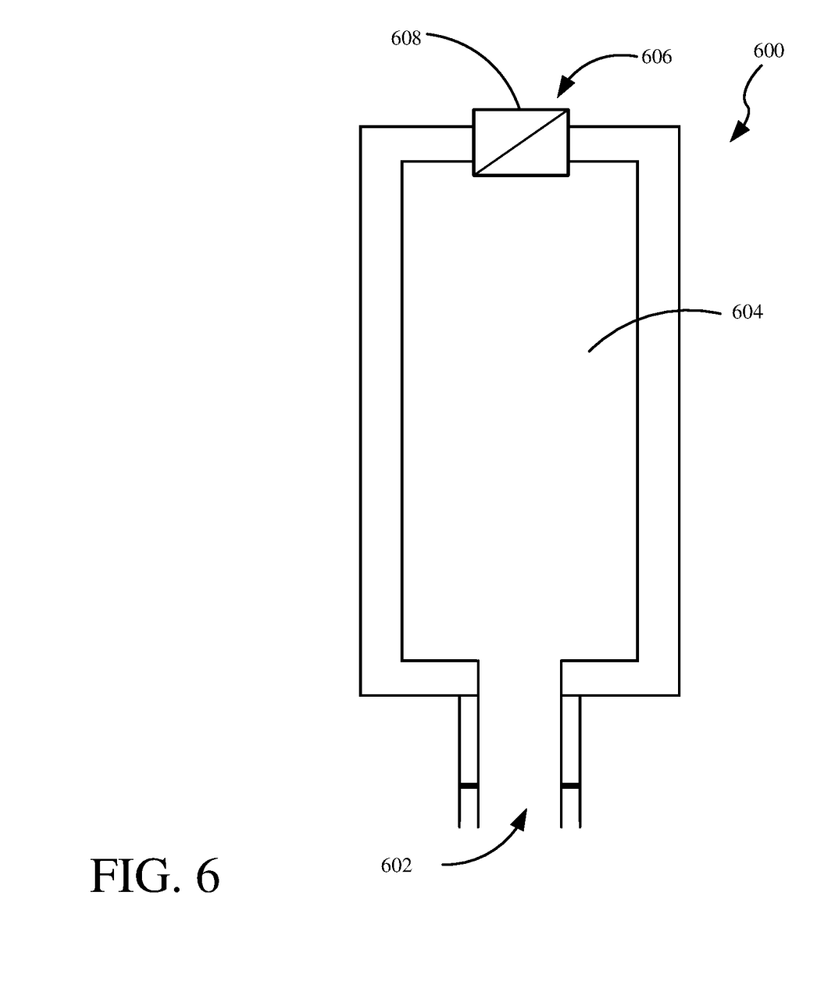
FIG. 6 illustrates an example of a vented hydraulic fluid reservoir.

FIG. 6 illustrates one example of a hydraulic fluid recovery reservoir (e.g., reservoir 228) in the form of a vented tank 600. Tank 600 includes an inlet port 602 configured to receive a flow of hydraulic fluid from a hydraulic fluid recovery line (e.g., line 230). A chamber 604 that is vented to atmosphere (via vent port 606) is configured to receive and store the hydraulic fluid. Vent port 606 includes an air valve (represented by block 608) and/or air filter, that is configured to allow air to flow into and out of chamber 604. In this example, back pressure is applied to the fluid due to the elevation of chamber 604 relative to the hydraulic fluid recovery line from which the fluid is received.

Figure 7:
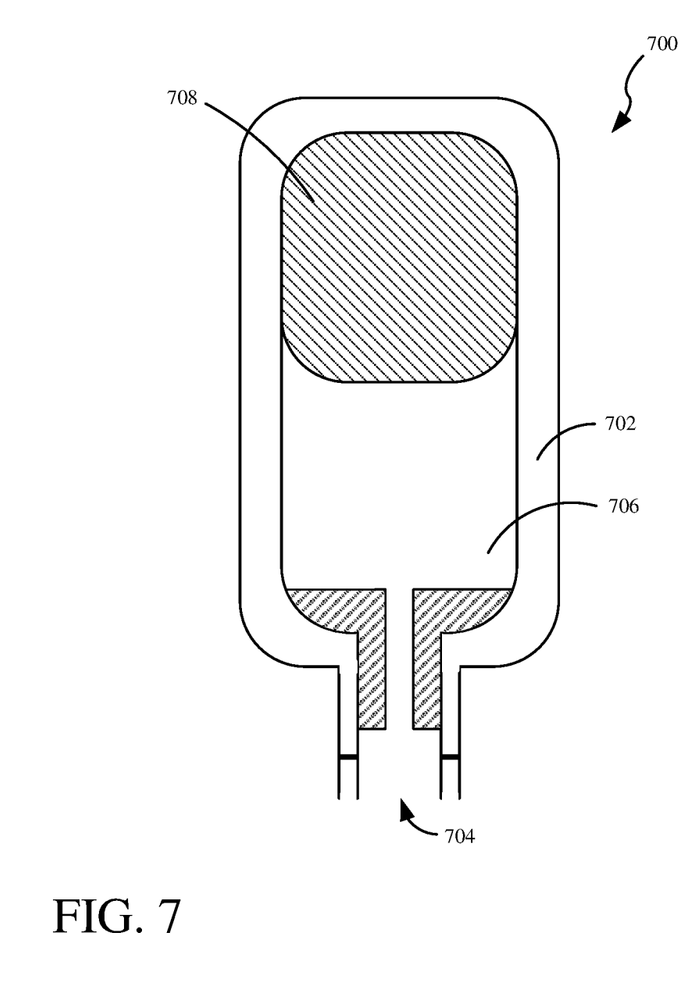
FIG. 7 illustrates an example of a pressurized hydraulic fluid accumulator.
Figure 8:
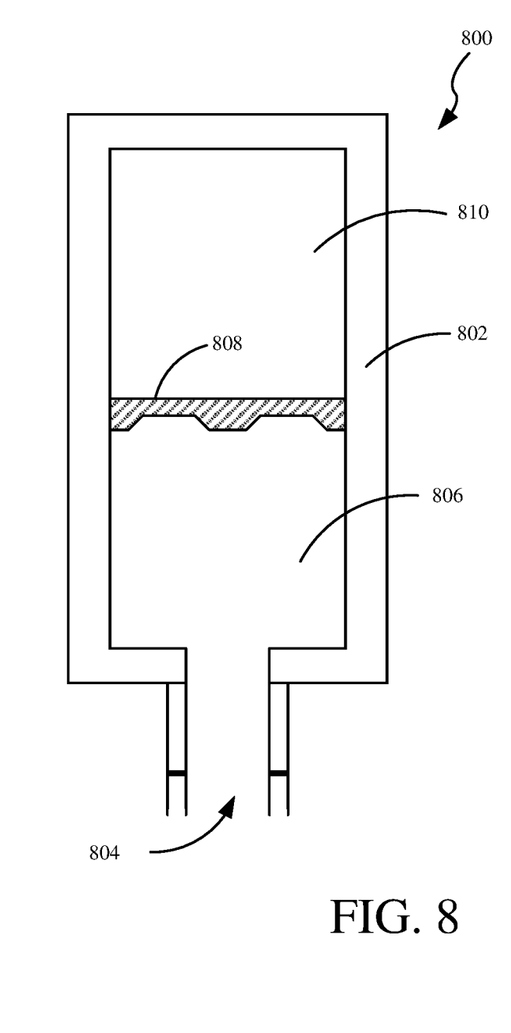
FIG. 8 illustrates an example of a pressurized hydraulic fluid accumulator.

FIGS. 7 and 8 illustrate examples of a hydraulic fluid recovery reservoir (e.g., reservoir 228) in the form of gas-charged hydraulic fluid accumulators. Accumulator 700 shown in FIG. 7 is a bladder-type accumulator having a vessel housing 702 with an inlet port 704 configured to receive a flow of hydraulic fluid from a hydraulic fluid recovery line (e.g., line 230). Vessel housing 702 forms a fluid chamber 706 configured to receive and store the hydraulic fluid. A gas-filled bag or bladder 708 has a pre-charge pressure, which applies back pressure against the fluid in chamber 706.

Accumulator 800 shown in FIG. 8 is a piston-type accumulator having a cylinder housing 802 with a inlet 804 into a fluid chamber 806. A piston 808 separates the fluid chamber 806 from a gas-filled chamber 810. As fluid enters chamber 806, piston 808 moves away from the inlet (i.e., upward in FIG. 8), which compresses the gas in chamber 810 and applies back pressure against the fluid.

In another example, a pressurized accumulator comprises a flexible diaphragm that separates a compressible gas and the fluid received from the fluid recover line.

Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is an implement comprising a mechanical coupling component configured to removably couple the implement to a support machine, a hydraulic fluid supply line configured to receive a supply flow of hydraulic fluid under pressure from a hydraulic system associated with the support machine, and a hydraulically-powered component configured to be actuated using the hydraulic fluid. The implement also includes a hydraulic fluid recovery system comprising a hydraulic fluid return line configured to fluidically couple to the hydraulic system associated with the support machine and provide a return flow of hydraulic fluid to the hydraulic system. A hydraulic fluid reservoir is configured to, when the hydraulic fluid return line is decoupled from the hydraulic system associated with the support machine, receive a portion of the hydraulic fluid from the hydraulic fluid return line when a fluid pressure in the hydraulic fluid return line increases to a pressure threshold.

Example 2 is the implement in any or all previous examples, wherein the support machine comprises a support vehicle configured to tow the implement using the mechanical coupling component.

Example 3 is the implement in any or all previous examples, wherein the implement comprises an agricultural implement and the hydraulically-powered component is configured to perform an agricultural operation.

Example 4 is the implement in any or all previous examples, wherein the agricultural operation comprises at least one of: a seeding operation, a planting operation, a bailing operation, a tilling operation, or a mowing operation.

Example 5 is the implement in any or all previous examples, wherein the fluid pressure in the hydraulic fluid return line increases due to thermal expansion of the hydraulic fluid.

Example 6 is the implement in any or all previous examples, wherein the pressure threshold is based on a back pressure applied by the hydraulic fluid reservoir to the hydraulic fluid received from the hydraulic fluid return line.

Example 7 is the implement in any or all previous examples, wherein the hydraulic fluid reservoir comprises a pressurized accumulator.

Example 8 is the implement in any or all previous examples, wherein the reservoir is at an elevated position on the implement relative to the hydraulic fluid return line.

Example 9 is the implement in any or all previous examples, wherein the pressure threshold comprises a first pressure threshold, the hydraulic fluid return line comprises an implement connector configured to connect to a corresponding support machine connector on the support machine, the implement connector comprises a flow control mechanism configured to allow fluid flow through the implement connector when the fluid pressure reaches a second pressure threshold, and the first pressure threshold is less than the second pressure threshold.

Example 10 is the implement in any or all previous examples, wherein the flow control mechanism comprises a thermal relief valve configured to open at the second pressure threshold.

Example 11 is the implement in any or all previous examples, and further comprising a load sense return line configured to fluidically couple to sensing circuitry associated with the hydraulic system, and a flow control mechanism configured to bleed fluid from the load sense return line to the hydraulic fluid reservoir when pressure in the load sense return line reaches a threshold pressure.

Example 12 is the implement in any or all previous examples, wherein the hydraulic fluid recovery system is configured to convey the hydraulic fluid stored in the hydraulic fluid reservoir to the hydraulic system when the hydraulic fluid return line is coupled to the hydraulic system.

Example 13 is a hydraulic system for an implement, the hydraulic system comprising a supply line connection configured to removably couple a hydraulic fluid supply line to a source hydraulic system associated with a support machine, a return line connection configured to removably couple a hydraulic fluid return line to the source hydraulic system, and a hydraulic fluid recovery component configured to convey hydraulic fluid from the hydraulic fluid return line to a hydraulic fluid reservoir while the hydraulic fluid return line is decoupled from the source hydraulic system, and when fluid pressure in the hydraulic fluid return line reaches a pressure threshold.

Example 14 is the hydraulic system in any or all previous example, wherein the implement comprises an agricultural implement having a hydraulically-powered component configured to perform an agricultural operation.

Example 15 is the hydraulic system in any or all previous examples, wherein the pressure threshold is based on a back pressure applied by the hydraulic fluid reservoir to the hydraulic fluid received from the hydraulic fluid return line.

Example 16 is the hydraulic system in any or all previous examples, wherein the hydraulic fluid reservoir comprises a pressurized accumulator.

Example 17 is the hydraulic system in any or all previous examples, wherein the pressure threshold comprises a first pressure threshold, the hydraulic fluid return line comprises an implement connector configured to connect to a corresponding support machine connector on the support machine, the implement connector comprises a flow control mechanism configured to allow fluid flow through the implement connector when the fluid pressure reaches a second pressure threshold, and the first pressure threshold is less than the second pressure threshold.

Example 18 is the hydraulic system in any or all previous examples, wherein the hydraulic fluid recovery system is configured to convey the hydraulic fluid stored in the hydraulic fluid reservoir to the hydraulic system when the hydraulic fluid return line is coupled to the hydraulic system.

Example 19 is an agricultural implement comprising a coupling assembly configured to removably couple the agricultural implement to a support machine, and a hydraulic system. The hydraulic system comprises a supply line connection configured to removably couple a hydraulic fluid supply line to a source hydraulic system associated with the support machine, a return line connection configured to removably couple a hydraulic fluid return line to the source hydraulic system, a flow control mechanism configured to prevent fluid flow through the return line connection at fluid pressures below a pressure threshold, and a hydraulic fluid recovery component configured to convey hydraulic fluid from the hydraulic fluid return line to a hydraulic fluid reservoir when the hydraulic fluid return line is decoupled from the source hydraulic system, and fluid pressure in the hydraulic fluid return line is less than the pressure threshold.

Example 20 is the agricultural implement in any or all previous examples, wherein the hydraulic fluid recovery system is configured to convey the hydraulic fluid stored in the hydraulic fluid reservoir to the hydraulic system when the hydraulic fluid return line is coupled to the hydraulic system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An implement comprising:
   a mechanical coupling component configured to removably couple the implement to a support machine;
   a hydraulic fluid supply line comprising a first implement connector configured to:
   connect to a corresponding first support machine connector of the support machine; and
   receive hydraulic fluid under pressure from a hydraulic system of the support machine;

a hydraulically-powered component configured to be actuated using the portion of hydraulic fluid; and
a hydraulic fluid recovery system comprising:
a hydraulic fluid return line that is separate from the hydraulic fluid supply line and comprises a second implement connector configured to:
connect to a corresponding second support machine connector of the support machine; and
return the hydraulic fluid to the hydraulic system; and
a hydraulic fluid reservoir configured to:
when the second implement connector is decoupled from the corresponding second support machine connector,
receive a portion of the hydraulic fluid from the hydraulic fluid return line when a fluid pressure in the hydraulic fluid return line increases to a pressure threshold.

2. The implement of claim 1, wherein the support machine comprises a support vehicle configured to tow the implement using the mechanical coupling component.

3. The implement of claim 1, wherein the implement comprises an agricultural implement and the hydraulically-powered component is configured to perform an agricultural operation.

4. The implement of claim 3, wherein the agricultural operation comprises at least one of:
a seeding operation, a planting operation, a bailing operation, a tilling operation, or a mowing operation.

5. The implement of claim 1, wherein the fluid pressure in the hydraulic fluid return line increases due to thermal expansion of the hydraulic fluid.

6. The implement of claim 1, wherein the pressure threshold is based on a back pressure applied by the hydraulic fluid reservoir to the hydraulic fluid received from the hydraulic fluid return line.

7. The implement of claim 6, wherein the hydraulic fluid reservoir comprises a pressurized accumulator.

8. The implement of claim 6, wherein the reservoir is at an elevated position on the implement relative to the hydraulic fluid return line.

9. The implement of claim 1, wherein
the pressure threshold comprises a first pressure threshold,
the second implement connector comprises a thermal relief valve configured to open at a second pressure threshold to allow fluid flow through the second implement connector when the fluid pressure reaches the second pressure threshold, and
the first pressure threshold is less than the second pressure threshold.

10. The implement of claim 1, wherein
when the second implement connector is coupled to the corresponding second support machine connector of the support machine, the hydraulic fluid recovery system is configured to convey the hydraulic fluid stored in the hydraulic fluid reservoir to the hydraulic system of the support machine.

11. A hydraulic system for an implement, the hydraulic system comprising:
a supply line connection configured to removably couple a hydraulic fluid supply line to a source hydraulic system associated with a support machine;
a return line connection configured to removably couple a hydraulic fluid return line to the source hydraulic system, wherein the hydraulic fluid return line comprises an implement connector configured to connect to a corresponding support machine connector on the support machine, the implement connector comprising a thermal relief valve; and
a hydraulic fluid recovery component configured to convey hydraulic fluid from the hydraulic fluid return line to a hydraulic fluid reservoir
while the hydraulic fluid return line is decoupled from the source hydraulic system, and
when fluid pressure in the hydraulic fluid return line reaches a first pressure threshold
wherein
the thermal relief valve is configured to open at a second pressure threshold to allow fluid flow through the implement connector when the fluid pressure reaches the second pressure threshold, and
the first pressure threshold is less than the second pressure threshold.

12. The hydraulic system of claim 11, wherein the implement comprises an agricultural implement having a hydraulically-powered component configured to perform an agricultural operation.

13. The hydraulic system of claim 11, wherein the pressure threshold is based on a back pressure applied by the hydraulic fluid reservoir to the hydraulic fluid received from the hydraulic fluid return line.

14. The hydraulic system of claim 13, wherein the hydraulic fluid reservoir comprises a pressurized accumulator.

15. The hydraulic system of claim 11, wherein the hydraulic fluid recovery system is configured to convey the hydraulic fluid stored in the hydraulic fluid reservoir to the hydraulic system when the hydraulic fluid return line is coupled to the hydraulic system.

16. An agricultural implement comprising:
a coupling assembly configured to removably couple the agricultural implement to a support machine; and
a hydraulic system comprising:
a supply line connection configured to removably couple a hydraulic fluid supply line to a source hydraulic system associated with the support machine;
a return line connection configured to removably couple a hydraulic fluid return line to the source hydraulic system;
a flow control mechanism configured to prevent fluid flow through the return line connection below a pressure threshold; and
a hydraulic fluid recovery component configured to convey hydraulic fluid from the hydraulic fluid return line to a hydraulic fluid reservoir when:
the hydraulic fluid return line is decoupled from the source hydraulic system, and
fluid pressure in the hydraulic fluid return line is less than the pressure threshold.

17. The agricultural implement of claim 16, wherein the hydraulic fluid recovery system is configured to convey the hydraulic fluid stored in the hydraulic fluid reservoir to the hydraulic system when the hydraulic fluid return line is coupled to the hydraulic system.

18. The agricultural implement of claim 16, wherein the hydraulic fluid reservoir comprises at least one of:
a pressurized accumulator, or
a reservoir at an elevated position relative to the hydraulic fluid return line;
and further comprising a hydraulically-powered component configured to perform an agricultural operation, wherein the agricultural operation comprises at least one of:

a seeding operation, a planting operation, a bailing operation, a tilling operation, or a mowing operation.

19. The agricultural implement of claim 16, wherein
the flow control mechanism is configured to:
   allow fluid flow through the return line connection when pressure in the hydraulic fluid return line is above a pressure threshold; and
   prevent fluid flow through the return line connection when pressure in the hydraulic fluid return line is below the pressure threshold; and
the hydraulic fluid recovery component is configured to convey hydraulic fluid from the hydraulic fluid return line to a hydraulic fluid reservoir when:
   the return line connection is decoupled from the corresponding connection of the source hydraulic system, and
   fluid pressure in the hydraulic fluid return line is less than the pressure threshold.

\* \* \* \* \*